United States Patent [19]

Richter et al.

[11] 4,430,029

[45] Feb. 7, 1984

[54] HIGH PRESSURE FEEDER DEFLECTION COMPENSATION

[75] Inventors: Ole J. Richter, Karlstad, Sweden; Johan C. F. C. Richter, St. Jean Cap Ferrat, France

[73] Assignee: Kamyr, Inc., Glens Falls, N.Y.

[21] Appl. No.: 209,118

[22] Filed: Nov. 21, 1980

[51] Int. Cl.³ .................. B65G 53/30; B65G 53/46
[52] U.S. Cl. .................... 406/63; 406/105; 210/251
[58] Field of Search .................. 406/63–65, 406/67, 171, 172, 105; 210/251, 541, 323.1, 345, 499

[56] References Cited

U.S. PATENT DOCUMENTS

| 4,082,368 | 4/1978 | Funk ................. 406/63 X |
| 4,338,049 | 7/1982 | Richter et al. ........... 406/63 |
| 4,354,777 | 10/1982 | Richter et al. ........... 406/63 |
| 4,372,711 | 2/1983 | Richter et al. ........... 406/63 |

FOREIGN PATENT DOCUMENTS

| 1255038 | 11/1967 | Fed. Rep. of Germany . |
| 428210 | 4/1935 | United Kingdom . |
| 918156 | 2/1963 | United Kingdom . |
| 1083770 | 9/1967 | United Kingdom . |
| 1078450 | 8/1967 | United Kingdom . |
| 1238326 | 7/1971 | United Kingdom . |

Primary Examiner—Thomas G. Wyse
Attorney, Agent, or Firm—Cushman, Darby & Cushman

[57] ABSTRACT

A high-pressure transfer device and method of utilization thereof are provided which allow flexing of the transfer device housing, and significant wear of the relatively rotatable components, without leakage. The transfer device includes a rotor having at least five diametrically through-going pockets, and enclosed by a housing having an exterior periphery and four ports disposed around the exterior periphery for registry with inlets to and outlets from the pockets. An interior screen is provided in each rotor pocket, and the rotor is cylindrical. Sealing structures are disposed between the rotor and housing around the external periphery of the rotor and interior periphery of the housing, the sealing structures maintaining effective sealing despite any relative movement between the housing and rotor, such as radial deflection of the housing. The sealing structures preferably comprise removable sealing shoes of a less wear-resistant material than the rotor. Pressure compensators for applying a force proportional to the liquid pressure at a particular point to maintain the sealing structures in sealing relationship with the rotor are provided at all of the ports, and accessory pressure compensators are provided adjacent the high-pressure ports.

36 Claims, 5 Drawing Figures

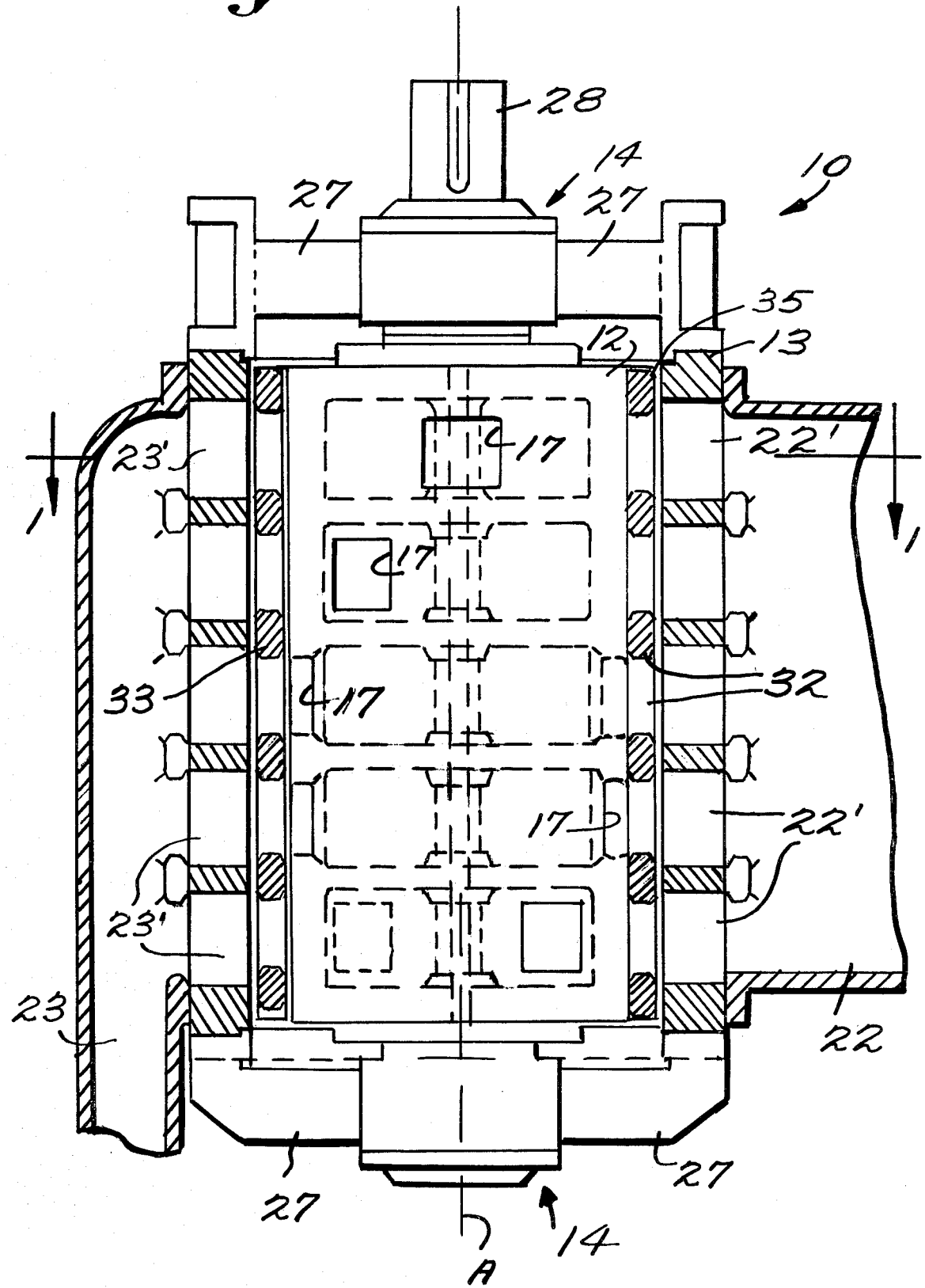

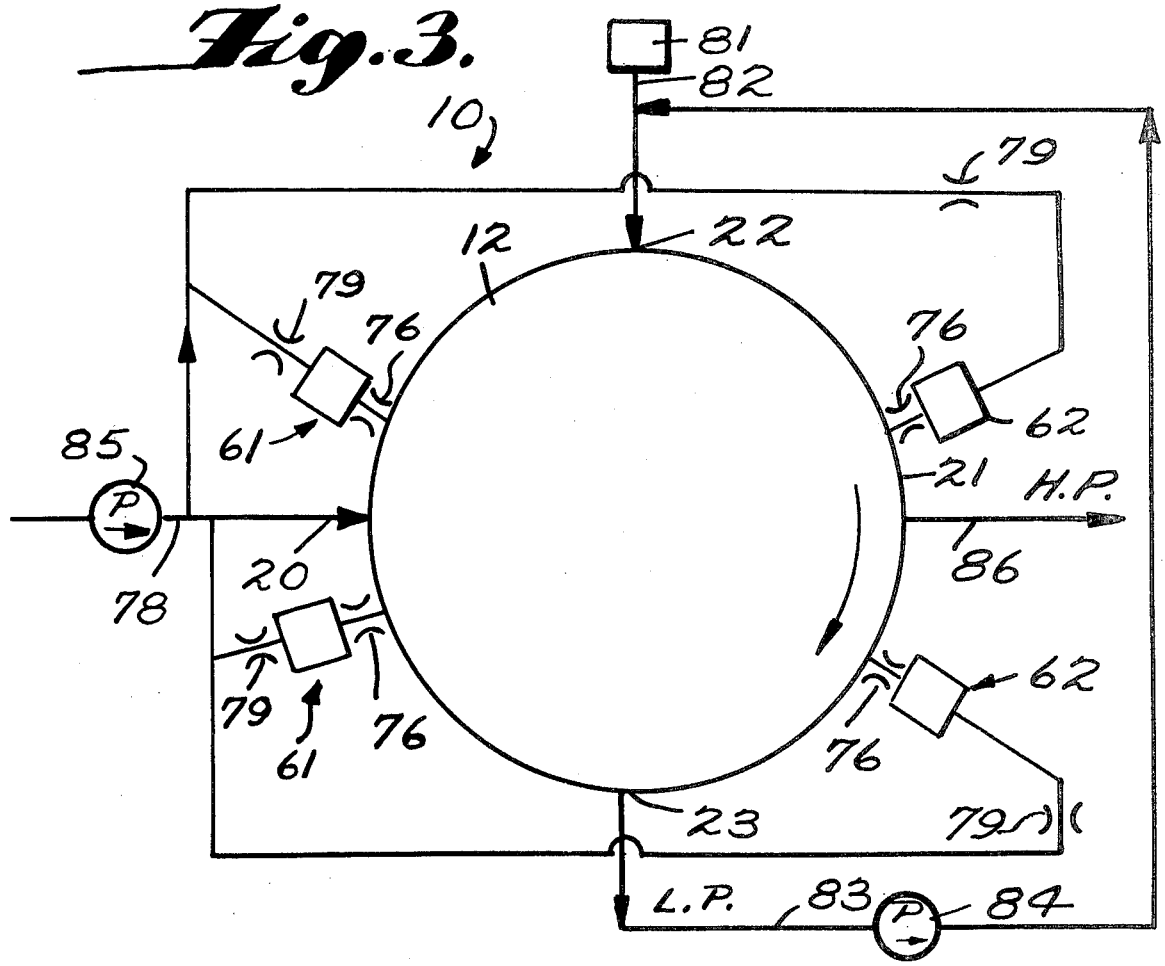
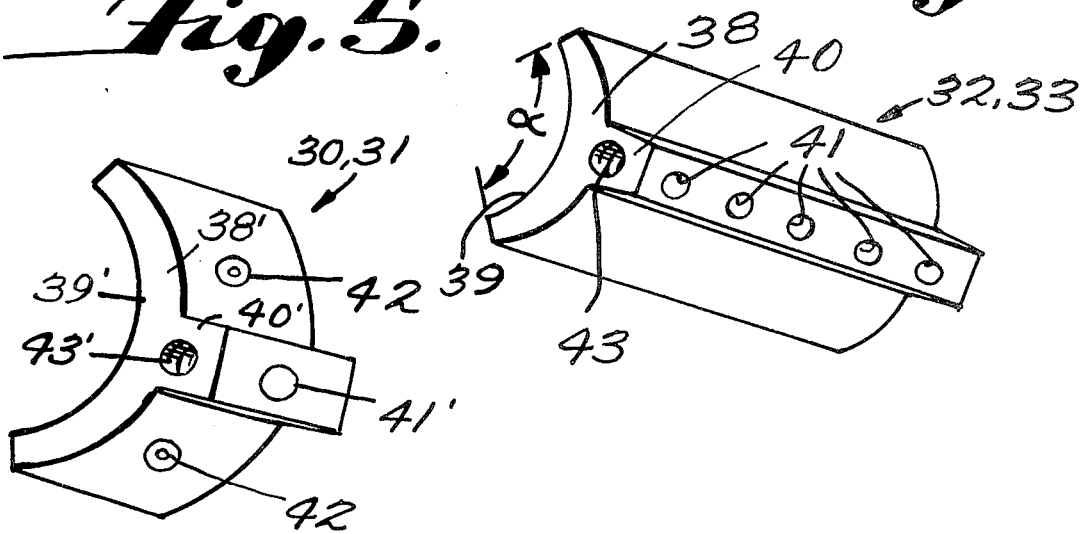

HIGH PRESSURE FEEDER DEFLECTION COMPENSATION

BACKGROUND AND SUMMARY OF THE INVENTION

As recognized in co-pending application Ser. No. 192,032 filed Sept. 29, 1980 now U.S. Pat. No. 4,354,777 (the disclosure of which is hereby incorporated by reference herein) conventional high-pressure transfer devices will have unacceptable leakage, and in fact may become non-operational, as a result of radial deflection of the transfer device housing under high-pressure conditions. In said co-pending application this tendency of the housing to radially deflect was counteracted by applying a radially inward force to the high-pressure portions of the housing. While such an arrangement is successful in performing this intended function, leakage may still be more than desired.

According to the present invention, a high-pressure transfer device (and methods of utilization thereof) is provided which can reduce leak volume even when the device is operated at extremely high-pressure differentials (e.g. 50 to 100 bars), and will not bind as a result of housing radial deflection. According to the present invention the high-pressure transfer device is constructed so that deflection of the housing is permitted, yet the construction is such that such deflection does not affect the amount of leakage, nor will the deflection result in binding of the rotor.

While the device according to the present invention is particularly adaptable for use where high-pressure differentials are encountered, it has broader applicability. In conventional high-pressure transfer device, even when operated under relatively small pressure differentials, only a small amount of wear of the rotor or other operative components can be tolerated. Conventionally only 1/10 inch of wear off the rotor can be compensated for without undue leakage. According to the present invention, however, much larger amounts of wear can be compensated for. For instance, wear on the order of ½ to ¾ inch of various component parts can be tolerated without unacceptable leakage, making the device according to the present invention advantageous for all situations where solids material in a suspension is to be transported, although the device is particularly advantageous for conveying coal, oil shale, mineral ores, etc. from the face to the surface of underground mines, and for pumping hard particulate material (such as manganese nodules) from an ocean floor (e.g. 15,000 feet below sea level) to the surface.

The high-pressure device according to the present invention includes a pocketed rotor having a plurality of diametrically through-going pockets, and rotatable about an axis. A housing encloses the rotor, the housing having an exterior periphery and four ports disposed around the exterior periphery for registry with inlets to and outlets from the pockets. Means are provided for mounting the rotor in the housing for rotation with respect to the ports about the axis of rotation, and screen means are provided for screening particulate material above a predetermined size out of the liquid passing through at least one of the ports. A large clearance volume is provided between the rotor and the housing, and sealing means are disposed in the large clearance volume. The sealing means provide minimized leakage of liquid between the rotor and housing while allowing relative rotational movement between the rotor and housing, and the sealing is unaffected by radial deflection of the housing.

The sealing means associated with the high-pressure device comprise at least one high-pressure shoe associated with the high-pressure inlet and at least one high-pressure shoe associated with the high-pressure outlet, and at least one low-pressure shoe associated with the low-pressure inlet and at least one low-pressure shoe associated with the low-pressure outlet. Each of the shoes is disposed between the rotor and housing and has at least one opening communicating with its respective port. The shoes may be continuous, running the entire axial extent of the transfer device with an opening provided therein for each rotor pocket, or may be segmented, each shoe being associated with only one rotor pocket. Normally the high-pressure sealing means will be segmented so that one shoe is associated with each rotor port, while the low-pressure shoes will each extend the entire axial length of the transfer device. Preferably the high-pressure shoes are made of a less wear-resistant material than the rotor, and are mounted (along with the low-pressure shoes) for axial movement so that they may be removed and replaced when worn.

The rotor is cylindrical and has at least five diametrically through-going pockets. Each pocket has an inlet and an outlet and the inlets and the outlets of the pockets are positioned so the pockets are spaced angularly around the exterior periphery of the rotor in such a way that an inlet or an outlet of one pocket is in direct liquid communication with each of the ports at all times. The screen means preferably comprises an interior screen disposed within each of the pockets, which interior screen can take any suitable form for performing its intended function. The pockets may extend straight through, or may be deflected axially and interweaved with each other, or may be otherwise constructed in any functional manner.

The transfer device further comprises means for applying a force proportional to the liquid pressure at a particular point for maintaining the sealing means in sealing relationship with the rotor. Such pressure-responsive force application means comprise a plurality of pressure compensators, each compensator having a pressure-responsive element operatively disposed between the housing and the sealing means and in liquid communication with the volume between the sealing means and rotor. A pressure compensator is associated with each shoe at each area of communication of each port with each pocket, and at least two accessory pressure compensators are associated with each high-pressure shoe, one on either side of the high-pressure inlet or outlet.

Preferably purge means are provided for introducing a purging liquid between each of the high-pressure shoes and the rotor, such as through the accessory pressure compensators. In such a case, the accessory pressure compensators communicate with the volume between the rotor and the shoes through an orifice, with high-pressure liquid being supplied thereto through a separate orifice for each, the construction of each of the orifices depending upon the particular pressure at the accessory pressure compensator with which they are associated. Each rotor pocket has an inlet and outlet of given arcuate circumferential dimension $\alpha$, and each low pressure shoe has an arcuate segmental portion on either side of the opening therein, each arcuate segmental portion having a circumferential dimension slightly greater than α. The purge means are provided to reduce wear of the rotor and sealing means, and to prevent contamination of the pressure compensator with particulate material, and also can serve to reduce the amount of torque needed to be applied to the rotor to affect start-up.

It the primary object of the present invention to provide a high-pressure transfer device which will not leak excessively even after extended wear of the relatively rotatable components thereof, and even under high-pressure conditions causing radial deflection of the housing. This and other objects of the invention will become clear from an inspection of the detailed description of the invention, and from the appended claims.

BRIEF DESCRIPTION OF THE DRAWINGS

FIG. 2 is a side cross-sectional view of the device of FIG. 1 taken along lines 2—2 thereof, with some parts shown in elevation;

FIG. 3 is a schematic view of the device of FIG. 1 showing the hydraulic circuitry associated therewith;

FIG. 4 is a perspective view of an exemplary low-pressure shoe utilizable with the transfer device of FIG. 1; and FIG. 5 is a perspective view of an exemplary high-pressure shoe utilizable with the device of FIG. 1.

DETAILED DESCRIPTION OF THE DRAWINGS

Figure 1:
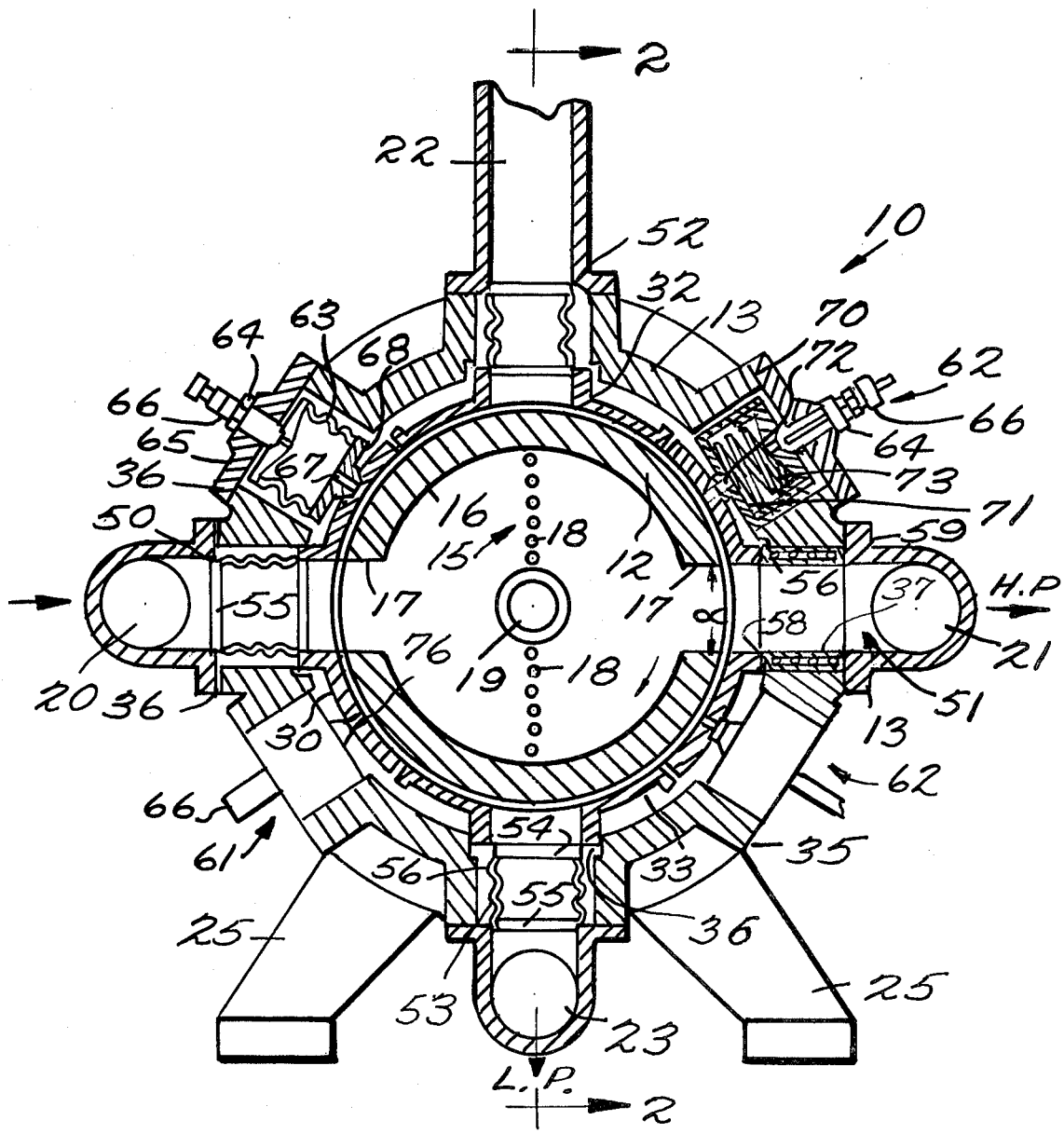
FIG. 1 is an end cross-sectional view of an exemplary high-pressure transfer device according to the present invention, taken along line 1—1 of FIG. 2.

An exemplary high-pressure transfer device according to the present invention is shown generally at 10 in FIGS. 1–3. The device 10 includes a rotor 12, housing 13, bearing means 14 for mounting the rotor 12 for rotation with respect to the housing about an axis A—A, and screen means 15 for screening particulate material above a predetermined size out of liquid passing through the high-pressure transfer device.

The rotor 12 is cylindrical, and is made out of a highly wear-resistant material such as stainless steel. An overlay of Stellite, or other hard material (e.g. ceramic) may be provided on the circumference of the rotor 12 to make it even more wear-resistant. The rotor 12 contains a plurality of diametrically through-going pockets 16, each pocket 16 communicating with the exterior of the rotor 12 through a pair of openings 17, which comprise inlets and outlets to and from the pocket 16. As illustrated in FIG. 2, the inlets and outlets 17 for the pocket 16 are spaced evenly around the exterior periphery of the rotor 12, being spaced angularly around the rotor periphery in such a way that an inlet or an outlet of one pocket is in direct liquid communication with each port (to be hereinafter described) of the housing 13 at all times. As indicated in FIG. 1 it is preferred that the screen means 15 comprise an interior screen 18 mounted in each pocket. A central shaft 19 may be provided extending through all of the pockets 16, and a surrounding collar 20 may also be provided spacing each pocket 16 axially spaced walls from each other.

The housing 13 may comprise an outer tubular shell which may be integral, or formed in several pieces, and includes four ports 20, 21, 22, and 23 disposed around the exterior periphery thereof. The port 20 is a high-pressure inlet, the port 21 is a high-pressure outlet, the port 22 (which is illustrated as a chute, but may also be a pipe) is a low-pressure inlet, and the port 23 is a low-pressure outlet. The housing is constructed so that an opening extending through housing wall is provided for each pocket of each roller. This may be best seen in FIG. 2 wherein an opening 22' is provided extending through housing 13 for each pocket 16, and an opening 23' is similarly provided for each pocket 16. The high-pressure inlet and outlet are similarly constructed.

The housing 13 may be mounted in any desired position. As illustrated in any FIG. 1, a plurality of legs 25 are provided for mounting the housing 13 so that the axis A—A of rotation of the rotor is horizontal. However, in the alternative mounting structures may be provided for mounting the axis A—A in any dimension or orientation. Also, associated with the housing are spider arms 27 (see FIG. 2) for mounting the bearing means 14 to allow rotation of the rotor 12 about the axis A—A. A terminating end-shaft 28 of rotor 12 is connected up to any suitable power source for effecting rotation of the shaft end 28, and thus the rotor 12.

According to the present invention the rotor 12 and housing 13 are dimensioned so that a large clearance volume is provided between the exterior of the rotor 12 and the interior of the housing 13, the clearance volume normally being on the order of several inches. Sealing means are disposed between the rotor 12 and housing 13 in this clearance volume, for maintaining effective sealing between the rotor and housing while allowing relative rotational movement therebetween. The sealing means are also constructed so that the sealing action thereof is unaffected by radial deflection of the housing, as may occur when the device 10 is operating with very large (e.g. 50 to 100 bars) pressure differentials, and further allows the housing 13 to deflect radially without danger of binding of the rotor 12.

The sealing means according to the present invention preferably comprise at least one high-pressure shoe 30 associated with the high-pressure inlet 20, at least one high-pressure shoe 31 associated with the high-pressure outlet 21, at least one low-pressure shoe 32 associated with the low-pressure inlet 22, and at least one low-pressure shoe 33 associated with the low-pressure outlet 23. A preferred form of low-pressure shoes 32, 33 is illustrated in FIG. 4, while a preferred form of high-pressure shoe 30 or 31 is illustrated in FIG. 5.

The shoes 30–33 are formed of metal, and at least the high-pressure shoes 30, 31 are formed of a metal that is significantly less wear-resistant than the material of which the rotor 12 is constructed (or at least the outer periphery thereof). For instance, the shoes 30, 31 can be made of cast iron. Since the housing is open on its ends, as illustrated in FIGS. 1 and 2 by the circumferential passageway 35 which communicates with the environment surrounding the device 10 and the volume between the rotor 12 and housing 13, the shoes 30–33 may be mounted so that they are axially removable. For instance, the grooves 36 (see FIG. 1) which locate the shoes 30–33 and prevent rotation thereof may be made continuous to the open ends of the housing 13 so that the shoes may be slid therealong.

With particular reference to FIGS. 4 and 5, details of construction of exemplary shoes may be seen. For instance in FIG. 4, a low-pressure shoe, 32, 33 is illustrated formed of a body 38 of metal, and having an arcuate interior surface 39 having substantially the same curvature as the rotor 12 with which it is adapted to cooperate, and comprising a cylindrical section. The shoe 32, 33 further comprises a radially extending portion 40 extending radially outwardly from the opposite side of the body 38 as the arcuate interior surface 39, and means defining at least one radial opening 41 extending through the radially extending portion 40 and arcuate interior surface 39. Preferably, the low pressure shoes 32, 33 are constructed as illustrated in FIG. 4, having a longitudinal extent comparable to the axial length of the rotor 12, with one opening 41 formed therein for each rotor port 16 (e.g. 5). Alternatively, the shoes 32, 33 may be segmented (as illustrated for the high-pressure shoe in FIG. 5), only one segment being provided for each rotor pocket 16. As further illustrated in FIGS. 1 and 4, the shoes 32, 33 have an arcuate segmental portion on either side of the opening(s) 41 having a circumferential dimension slightly greater than α, wherein α is the circumferential dimension of an opening 17 to a pocket 16.

The high-pressure shoe illustrated in FIG. 5 is generally comparable to the low-pressure shoe illustrated in FIG. 4 (like reference numerals illustrating like components in the two figures, only being followed by a "'" in FIG. 5), except that the arcuate extent of the interior surface 39' is greater, and at least one radially extending opening 42 is provided on either side of the radially extending portion 40'. The openings 42, whose purpose will be hereinafter described, has an orifice (such as a sharp-edged orifice having a pressure drop thereacross) at the interior surface 39'. While the shoe 30, 31 is illustrated in FIG. 5 as a segment for cooperation with only one rotor pocket 16, it can be elongated, extending the entire axial length of the device 10, as is the case for the low-pressure shoe illustrated in FIG. 4.

In order to facilitate replacement of the shoes 30–33, preferably a screw-threaded opening 43, 43', adapted to receive a screw-threaded rod therein, is formed in an end face of the shoe and extends generally parallel to the arcuate interior surface 39, 39'.

The device 10 further comprises means for applying a force proportional to liquid pressure at a particular point (and roughly proportional to the high-pressure at the inlet 20) for maintaining the sealing means in sealing relationship with the rotor. Preferably such force applying means takes the form of a plurality of pressure compensators. For instance a pressure compensator 50–53 is associated with each of the housing ports 20–23, and their associated shoes 30–33, respectively. Each pressure compensator comprises a pressure-responsive element operatively disposed between the housing 13 and the shoe 30–33 with which it cooperates, and is in liquid-communication with the volume between the sealing means (shoes) and the rotor 12. In the embodiment illustrated in FIG. 1, the inlet-outlet mounted pressure compensators 50, 52 and 53 comprise bellows having metal sealing rings 54, 55 disposed at the opposite ends thereof, while the pressure compensator 51 is illustrated as a pair of relatively moveable concentric tubes (e.g. piston and cylinder) with a seal 56 therebetween, as well as a spring 57 providing pre-loading tending to bias the sealing surfaces 58, 59 thereof into operative engagement with the shoe 31 and housing 13, respectively. Any other suitable type of pressure-responsive element also may be provided.

In addition to the pressure compensators associated with the inlets and outlets 20–23, additionally a pair of accessory pressure compensators are associated with each high-pressure shoe segment 30, 31. Where the rotor 12 has five pockets, and the housing 13 has five openings associated with each port, twenty accessory pressure compensators will thus be provided. The accessory pressure compensators communicate with the openings 42 formed in the high-pressure shoe segments 30, 31. In FIG. 1, the accessory pressure compensators associated with shoe 30 are illustrated generally at 61, while the pressure compensators associated with each shoe 31 are illustrated generally at 62.

In the exemplary embodiment illustrated in the drawings, the compensator 61 is illustrated as a bellows 63, the pre-loading on the bellows being adjustable by communication between the interiorly threaded nut 64 formed on cap 65, and the exteriorly threaded tube 66. An opening 67 extends from end plate 68 of bellows 63 in communication with the opening 42 in shoe 30. In the exemplary embodiment illustrated in FIG. 1, the pressure compensator 62 is illustrated as a piston and cylinder arrangement, the piston being illustrated at 69, the cylinder at 70, the cylinder end wall at 71, the opening in end wall 71 at 72, and a spring pre-loading being provided by coil spring 73. Again a tube 66, threaded nut 64, and cap 65 are provided.

Further according to the present invention, it is desirable to provide purge means for introducing a purging liquid between the sealing means (shoes 30–33) and the rotor 12. Preferably the purging liquid is introduced through the tubes 66 of the accessory pressure compensators 61, 62. The purging liquid tends to reduce wear between the rotor 12 and shoes 30–33, prevents particles from entering the accessory pressure compensators 61, 62, and can reduce the torque necessary to effect start up. FIG. 3 schematically illustrates the exemplary hydraulic circuitry for the purge means.

When purge means are utilized, the openings 42 at the interior surfaces 39' of the high-pressure shoes 30, 31 are formed as first orifices, indicated by reference numeral 76 in the drawings, having a pressure drop thereacross. High-pressure liquid is supplied to the pressure compensators 61, 62 from an inlet pipe 78 communicating with the high-pressure inlet to the device 10, and a second orifice 79 is provided in the hydraulic circuitry between pipe 78 and each pressure compensator 61, 62. The second orifices 79 are constructed differently depending upon the desired purge liquid pressure for the pressure compensator with which it is associated. Since the pressure of liquid leaking between the rotor 12 and shoes 30–33 will be different at different points of the device 10, the orifices 79 will differ accordingly.

The rest of the circuitry for feeding liquid with entrained particulates to and from the device 10 is also illustrated in FIG. 3. Liquid with entrained particulates (e.g. manganese nodules) is supplied from source 81 through inlet pipe 82 to low-pressure inlet 22, and is withdrawn through pipe 83 under the suction provided by low-pressure pump 84 from low-pressure outlet 23, the particulates having been screened by the interior screens 18. The liquid from pipe 83 is returned to inlet pipe 82 as illustrated. High-pressure liquid from any desired source (such as the surrounding water itself when the transfer device 10 is utilized for ocean floor mining) is pumped by high-pressure pump 85 through pipe 78 to high-pressure inlet 20, with pipe 86 leading from high-pressure outlet 21 to the eventual area (e.g. the surface of the water) where the pumped particulate material entrained in liquid is to be utilized.

An examplary apparatus according to the present invention having been described, an examplary manner of construction and utilization thereof will now be set forth:

The housing 13 may be cast in one piece (or constructed in segments and bolted together), with only the groove 36 being machined. The rotor 12 is inserted into the housing 13, and mounted by the bearing means 14 supported from housing 13 by spider arms 27. The clearance between the spider arms is sufficient to allow axial insertion of the shoes 30–33 between the rotor 12 and housing 13, in each case a rod being screwed into the opening 43, 43' of the respective shoe, and the shoe pushed into place, being located by and sliding in the machined grooves 36, which cooperate with the radially extending portions 40 when the or all the openings 41, 41' associated with each shoe are properly aligned with the openings (e.g. openings 22', 23') of the respective housing ports, the pressure compensators 50–53, 61, and 62 are mounted in place, as illustrated in FIG. 1. Then the end caps 65 and the pipes or chutes forming the ports 20–23 are bolted into place. The feed and outlet pipes 78, 82, 83 and 86 are appropriately connected to the housing ports, and the orifices 79 are appropriately connected by tubing to the inlet line 78.

To effect start up of the rotor 12, liquid under high pressure is sent through the pressure compensators 61, 62 and orifices 79, 76 to between the shoes 30, 31 and rotor 12, reducing the torque necessary for start up, then the shaft end 28 is rotated by any suitable means, effecting rotation of the rotor 12 in the direction of the arrow in FIGS. 1 and 3, and causing the inlets and outlets 17 of each pocket 16 to successively come into operative association with each of the inlets and outlets 20–23. Once start up has been effected, liquid containing hard particulate material, or the like, is fed from source 81 through conduit 82 into the housing port 22, screening of the particulate material from the liquid takes place within the pocket 16 into which it is introduced, and the liquid is withdrawn through outlet 23 and outlet pipe 83. Liquid under high pressure is pumped from pump 85 through port 20 entraining the particulate material within the pocket with which it communicates therein, the entrained material and liquid passing through outlet 21 and outlet pipe 86. The pockets 16 and their openings 17 are so constructed, and the number of them is such, that at least one pocket is in operative communication with each port 20–23 at all times.

Should the housing 13 deflect radially outwardly at the high-pressure inlet and outlet 20, 21 due to a high-pressure differential under which it is operating (e.g. 50 to 100 bars), the deflection will readily be taken up by the sealing shoes 30–33, no excessive leakage occurring and no binding of the rotor 12 being possible. Liquid that does leak from the inlets and outlets 17, and the associated inlets and outlets 20–23, flows between the shoes 30, 31 and the rotor 12 into communication with the opening 42, passing into the accessory pressure compensators 61, 62 and providing a proportional force tending to maintain sealing contact. Liquid leaking between the low-pressure shoes 32, 33 and the rotor 12 will pass through the openings between the high and low pressure shoe and out the passageway 35. The pressure differential between the exterior and interior of each of the pressure compensators 50–53 maintains the sealing structures thereof in sealing contact with the housing 13 (e.g. openings 22', 23') and the radially extending openings (41, 41') in the shoe radially extending portions.

Should the shoes 30, 31 (and/or 32, 33) wear excessively (e.g. more than about ¾ inch), the device 10 is shut down, the pressure compensators 50–53, 61, and 62 are removed, and rods are inserted into screw-threaded engagement with the openings 43' (and/or 43) of the shoes. An axial force is then applied to the rods, causing relative sliding movement in grooves 36 between the shoes and the housing, and allowing the shoes to be removed and replaced with new shoes.

While the invention has been illustrated in the exemplary embodiment with five pockets and the rotor 12, more pockets may be provided if desired. For instance, where six overlapping pockets are provided, the number of high-pressure shoe segments 30, 31 can be reduced to three, each having an opening 41' communicating with two pockets 16. Of course, other modifications are also possible, and the invention is to be accorded the broadest interpretation of the appended claims so as to encompass all equivalent apparatus and methods.

What is claimed is:

1. A high-pressure transfer device including: a pocketed rotor containing a plurality of diametrically through-going pockets, said rotor rotatable about an axis; a housing enclosing said rotor, said housing having an exterior periphery and four ports disposed around the exterior periphery thereof for registry with inlets to and outlets from said through-going pockets; means for mounting said rotor in said housing for rotation with respect to said ports about said given axis of rotation, and in a given direction; screen means for screening particulate material above a predetermined size out of the liquid passing through at least one of said ports; and sealing means mounted to said housing and disposed between said rotor and said housing around the external periphery of said rotor and internal periphery of said housing for providing a biasing force and radially movable to provide minimized leakage of liquid between said rotor and housing while allowing relative rotational movement between said rotor and said housing.

2. A high-pressure transfer device including: a pocketed rotor containing a plurality of diametrically through-going pockets, said rotor rotatable about an axis; a housing enclosing said rotor, said housing having an exterior periphery and four ports disposed around the exterior periphery therefor for registry with inlets to and outlets from said through-going pockets; means for mounting said rotor in said housing for rotation with respect to said ports about said given axis of rotation, and in a given direction; screen means for screening particulate material above a predetermined size out of the liquid passing through at least one of said ports; and a large clearance volume being provided between said rotor and said housing, and sealing means disposed in said large clearance volume and for providing a biasing force and radially movable for maintaining effective sealing between said rotor and housing unaffected by radial deflection of said housing.

3. A high-pressure transfer device including: a pocketed rotor containing a plurality of diametrically through-going pockets, said rotor rotatable about an axis; a housing enclosing said rotor and having an exterior periphery having four ports including a high-pressure inlet opposite a high-pressure outlet, and a low-pressure inlet opposite a low-pressure outlet; means for mounting said rotor for rotation with respect to said housing ports about said given axes of rotation in a given direction of rotation; screen means for screening particulate material above a predetermined size out of the liquid passing through at least one of said ports; at least one high-pressure shoe associated with said high-pressure inlet and at least one high pressure shoe associated with said high-pressure outlet; and at least one low pressure shoe having an opening aligned with said low-pressure inlet and at least one low-pressure shoe having an opening aligned with said low-pressure outlet; each of said shoes disposed between said rotor and said housing and having at least one opening communicating with its respective port.

4. A high-pressure transfer device including a housing having an exterior periphery with four ports disposed around the exterior periphery; a cylindrical rotor disposed within said housing; means for mounting said rotor in said housing for rotation with respect to said ports about a given axis of rotation, and in a given direction; said rotor having at least five diametrically through-going pockets, each pocket having an inlet and an outlet, said inlets and outlets of said pockets being spaced angularly around the exterior periphery of said rotor in such a way that an inlet or an outlet of one pocket is in direct liquid communication with each of said ports at all times; and an interior screen for screening out particulate material above a predetermined size disposed within each of said pockets.

5. A device as recited in claim 1 wherein said sealing means comprises means for taking-up relative radial movement between said housing and rotor as a result of radial deflection of said housing.

6. A device as recited in claim 1, 2, or 3 wherein said rotor is cylindrical and has at least five diametrically through-going pockets with inlets and outlets spaced evenly around the exterior periphery thereof, and wherein said screen means comprises an interior screen disposed within each of said pockets.

7. A device as recited in claim 1 further comprising means for applying a force proportional to the liquid pressure at a particular point for applying biasing force maintaining said sealing means in sealing relationship with said rotor.

8. A device as recited in claim 7 wherein said force applying means comprises a plurality of pressure compensators, each compensator comprising a pressure-responsive element operatively disposed between said housing and said sealing means.

9. A device as recited in claim 8 wherein said pressure compensators include a pressure compensator at the area of communication of each port with each pocket, and a plurality of accessory pressure compensators flanking the areas of communication of some of the ports with each pocket.

10. A device as recited in claim 9 further comprising purge means for introducing a purging liquid between said sealing means and said rotor.

11. A device as recited in claim 10 wherein said purge means are associated with each of said accessory pressure compensators, and wherein each of said accessory pressure compensators communicates with the volume between said sealing means and rotor through a first orifice, and wherein purge liquid is supplied to each of said accessory pressure compensators from a high-pressure liquid source for said device through a second orifice.

12. A device as recited in claim 2 further comprising means for applying a biasing force proportional to the liquid pressure at a particular point for maintaining said sealing means in sealing relationship with said rotor.

13. A device as recited in claim 12 wherein said force applying means comprises a plurality of pressure compensators, each compensator comprising a pressure-responsive element operatively disposed between said housing and said sealing means.

14. A device as recited in claim 13 wherein said pressure compensators include a pressure compensator at the area of communication of each port with each pocket, and a plurality of accessory pressure compensators flanking the areas of communication of some of the ports with each pocket.

15. A device as recited in claim 14 further comprising purge means for introducing a purging liquid between said sealing means and said rotor.

16. A device as recited in claim 15 wherein said purge means are associated with each of said accessory pressure compensators, and wherein each of said accessory pressure compensators communicates with the volume between said sealing means and rotor through a first orifice, and wherein purge liquid is supplied to each of said accessory pressure compensators from a high-pressure liquid source for said device through a second orifice.

17. A device as recited in claim 3 further comprising a plurality of pressure compensator means for applying a biasing force proportional to the liquid pressure at a particular point for maintaining said shoe in sealing relationship with said rotor, each compensator means comprising a pressure-responsive element operatively disposed between said housing and said shoe.

18. A device as recited in claim 17 wherein said pressure compensators include a pressure compensator associated with each shoe at each area of communication of each port with each pocket, and at least two accessory pressure compensators associated with each high-pressure shoe, one on either side of said high-pressure inlet or outlet.

19. A device as recited in claim 18 further comprising purge means for introducing a purging liquid between each of said high-pressure shoes and said rotor.

20. A device as recited in claim 19 wherein said purge means comprises means for introducing purging liquid into the interior of each of said accessory pressure compensators, and wherein each of said accessory pressure compensators communicates with the volume between said rotor and said shoes through an orifice.

21. A device as recited in claim 3 wherein said high-pressure shoes are made of a material that is much less wear-resistant than the material of which the rotor is made.

22. A device as recited in claim 21 further comprising means for releasably mounting said high-pressure shoes for axial movement with respect to said rotor and housing so that they may be withdrawn and replaced when worn.

23. A device as recited in claim 22 wherein a high-pressure shoe is associated with each area of communication of each of the high-pressure inlet and outlet with each pocket.

24. A device as recited in claim 23 wherein a common low-pressure shoe is associated with each area of communication of each of the low-pressure inlet and outlet for each pocket.

25. A device as recited in claim 3 wherein each rotor pocket has an inlet and outlet of given arcuate circumferential dimension $a$, and wherein each low-pressure shoe has an arcuate segmental portion on either side of said opening therein, each of said arcuate segmental portions having a circumferential dimension slightly greater than α.

26. A device as recited in claim 3 further comprising means effecting communication of the volume between said shoes and said housing with the environment.

27. A device as recited in claim 17 further comprising spring means for applying a pre-loading to said pressure compensator means for maintaining said shoes in sealing relationship with said rotor.

28. A device as recited in claim 7 or 12 further comprising spring means for applying a preloading to said pressure-responsive force applying means.

29. A device as recited in claim 1 or 2 wherein said sealing means and said rotor are both made of metal.

30. A device as recited in claim 29 wherein the metal of which said rotor is made is more wear-resistant than the metal of which said sealing means is made so that said sealing means will wear out much more quickly than said rotor.

31. A device as recited in claim 29 further comprising means for releasably mounting said sealing means for axial movement with respect to said housing and rotor so that the sealing means may be removed and replaced when the device is shut down.

32. A device as recited in claim 8 or 13 wherein said pressure-responsive elements are in liquid-communication with the volume between said sealing means and rotor.

33. A device as recited in claim 8 or 13 wherein one of said ports comprises a high-pressure inlet port, and wherein said force applying means comprises a pressure compensator at the area of communication of said high-pressure inlet port with rotor pockets, said pressure compensator operatively surrounding said high-pressure inlet port.

34. A device as recited in claim 8 or 13 further comprising purge means for introducing a purging liquid between said sealing means and said rotor.

35. A device as recited in claim 17, wherein said pressure-responsive elements are in liquid communication with the volume between said shoe and rotor.

36. A device as recited in claim 17 further comprising purge means for introducing a purging liquid between each of said high-pressure shoes and said rotor.

* * * * *